United States Patent [19]

Kurata et al.

[11] Patent Number: 4,583,127
[45] Date of Patent: Apr. 15, 1986

[54] REPRODUCING MACHINE

[75] Inventors: Masami Kurata; Fujio Moriguchi; Hisao Nakajima; Toshiharu Inui, all of Kanagawa, Japan

[73] Assignee: Fuji Xerox Co., Ltd., Kanagawa, Japan

[21] Appl. No.: 329,465

[22] Filed: Dec. 10, 1981

[30] Foreign Application Priority Data

Dec. 10, 1980 [JP] Japan ................. 55-174071
Dec. 10, 1980 [JP] Japan ................. 55-174074

[51] Int. Cl.⁴ ............................................ H04N 1/22
[52] U.S. Cl. ............................ 358/298; 358/286; 358/287; 346/76 PH
[58] Field of Search ............. 358/287, 286, 283, 293, 358/298, 256, 303, 300, 304, 288, 257; 346/76 PH; 382/47; 355/13, 48, 50

[56] References Cited

U.S. PATENT DOCUMENTS

| | | | |
|---|---|---|---|
| 4,188,113 | 2/1980 | Hiraga | 358/293 |
| 4,240,117 | 12/1980 | Wellendorf et al. | 358/293 |
| 4,275,450 | 6/1981 | Potter | 358/287 |
| 4,303,936 | 12/1981 | Shaw | 358/287 |
| 4,319,283 | 3/1982 | Ozawa et al. | 358/293 |
| 4,352,128 | 9/1982 | Ohori et al. | 358/293 |
| 4,439,790 | 3/1984 | Yoshida | 358/256 |
| 4,442,459 | 4/1984 | Fukui et al. | 358/286 |
| 4,449,147 | 5/1984 | Ogasawara | 358/293 |

FOREIGN PATENT DOCUMENTS 55-99875  7/1980 Japan ................. 358/287
55-118268 9/1980 Japan ................. 358/287

OTHER PUBLICATIONS

E. Hatabe et al. "The MELFAS-510 High-Speed Thermal-Printing Facsimile Transceiver", Mitsubishi Elec. Adv. (Japan) vol. 9, Sep. 1979, pp. 23-25.

Primary Examiner—Edward L. Coles, Sr.
Attorney, Agent, or Firm—Sughrue, Mion, Zinn, Macpeak and Seas

[57] ABSTRACT

A copying machine includes an optical sensor of the line scanning type for converting an image into electrical signals, a thermal recording head controlled in accordance with the image signals, and a heat-sensitive paper web on which the image is formed by heat generated from the thermal recording head. The platen moves with respect to the read unit and the read unit will read in both forward and reverse directions of the platen, and the magnification value can be varied. The total width of energized heating elements and the movement length and speed of the platen may be controlled in accordance with the size of the original. The total number of heating elements energized at any one time is limited, and the machine includes input and output terminals for sending image information externally and for receiving and recording image information other than directly from the read unit.

13 Claims, 3 Drawing Figures

REPRODUCING MACHINE

BACKGROUND OF THE INVENTION

This application is related to concurrently filed and commonly assigned applications Ser. No. 329,468 filed Dec. 19, 1981 and now issued as U.S. Pat. No. 4,449,152, and Ser. No. 329,466 filed Dec. 10, 1981, and now issued as U.S. Pat. No. 4,442,460.

This invention concerns a reproducing machine and, more specifically, it relates to a reproducing machine for preparing a plurality of copies from one sheet of original document.

Reproducing machines include those types utilizing a diazo photographic process, xerographic process, and the like. However, in the diazo photographic process, only one copy can be obtained from one sheet of original and, to obtain a plurality of copies, reproduction procedures have to be repeated for the required number of sheets. In addition, the originals used are restricted to those of transparent or semitransparent types. In the xerographic process, a plurality of copies can be obtained from one sheet of original and there is no restriction on the type of original. However, a xerographic process requires a great amount of electrical power for fixing images to the sheet after development, needs heat insulation for the fixing device and further is disadvantageous in that the overall size of the machine is increased.

SUMMARY OF THE INVENTION

Accordingly, an object of this invention is to provide a compact reproducing machine with less electrical power consumption, which is simple in structure and capable of preparing a plurality of copies from one sheet of original document.

In order to attain the foregoing object, this invention provides a thermal recording type recording machine comprising a reciprocable platen for carrying an original document, means for reciprocating the platen, an image sensor for reading each line of the original document on the movable platen to generate electrical image signals, a thermal recording head for generating heat in a pattern corresponding to the electrical image signals, means for closely contacting under pressure a heat-sensitive paper web to the thermal recording head to form the pattern, and means for discharging the recorded paper web to thereby obtain a reproducing machine simple in structure, reduced in size and with less electrical power consumption.

In this invention, it is preferred that the platen can be pivotted in order to enable the roll to be taken-out of the reproducing machine for exchanging the roll. Further, an automatic cutter is provided upstream of the discharge tray so that the recorded paper web may be cut into a predetermined length. By being designed such that the electrical image signals from the image sensor can also be transmitted externally and also such that external image signals can be received and reproduced, the reproducing machine according to this invention can be used as a facsimile transmitter and receiver, and can also be used in conjunction with an external signal processor to perform image synthesis, image elimination, image enhancement, etc. It is also preferred to provide a white line skip function, a circuit for generating pseudo half-tone regeneration signals, and an image enlarging and diminishing function.

The thermal recording head comprises a plurality of heat generation resistor elements and, by controlling them while dividing them into blocks, the capacity of the power source can be decreased. Particularly, in a case where black information of the image signals for one line exceeds a predetermined ratio, the power source drain can be minimized by increasing the number of blocks and decreasing the number of elements in one block, i.e., decreasing the number of elements which may be simultaneously energized. Further, the reproducing machine according to this invention can read the images not only in the forward stroke but also in the backward stroke of the platen, during which backward stroke the machine is adapted to rearrange the image signals.

It is also preferred to detect the width and the length of the original to control the transmission amount and the moving distance of the platen for one line of the image signals.

BRIEF DESCRIPTION OF THE DRAWINGS

This invention will be described in more detail by way of a preferred embodiment with reference to the accompanying drawings, in which.

DETAILED DESCRIPTION OF THE INVENTION

Figure 1:
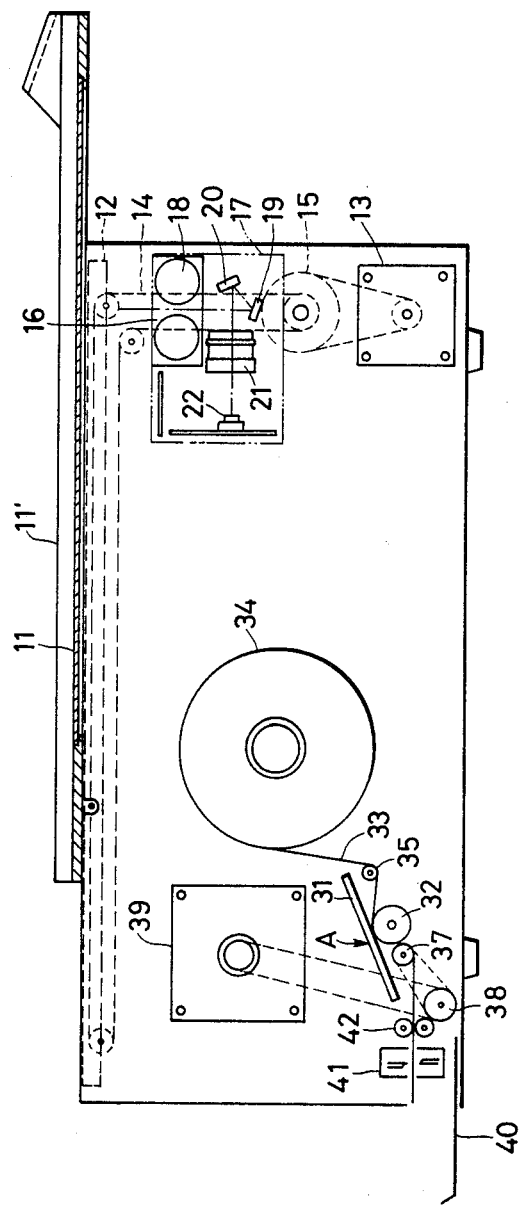
FIG. 1 is a schematic side view of a thermal recording type reproducing machine according to this invention.

In FIG. 1, a platen 11 carrying an original has a cover 11' thereon and is disposed reciprocably on rails 12 provided on both sides of the upper portion of the reproducing machine. A step motor 13 and a driving belt 14 are provided for reciprocating the platen 11, and the platen 11 is thus driven by the step motor 13. As shown in the drawing, a driving roller 15 may be interposed between the step motor 13 and the driving belt 14.

On one side of the reproducing machine is fixedly provided an image reading unit 17 having a slitlike opening 16 on the side facing the platen 11. The image reading unit 17 comprises an optical source 18 for illuminating the original, mirrors 19, 20 for changing the optical path of optical images reflected from the original, a lens 21 for focusing the optical images, and an image sensor 22 for converting the focused optical images into electrical signals containing image information. The image sensor 22 used comprises three sets of photo diode arrays arranged end-to-end each consisting of 1024 elements in a row, for example, whereby information for one line with 256 mm width can be read at 12 dot/mm resolution power. The value and the type of the elements are given only as examples and other numbers of elements may be provided or different types such as charge-coupled devices (CCD) may be employed. In any case, the image sensor 22 is adapted to read one line of information on the original either simultaneously or successively, i.e., in a scanning manner. On the inside of the reproducing machine, a cylindrical recording paper supply member 25 is detachably mounted.

In an image forming station A are provided a thermal recording head 31 and a back roller 32 opposing the head surface. The thermal recording head 31 is of an elongated shape on which a plurality of ohmic heat generation members are disposed side by side on a line extending in the lateral direction of the reproducing machine so that one line of information read by the image sensor 22 can be recorded on the recording paper web. Since energization of too many of these heat generation members at the same time would require a power source of a large capacity, they are divided into blocks of a predetermined number and each block energized at a different time in order to decrease the required capacity of the power source. As an example, 1728 dots of resistor elements can be divided into 4 blocks of 432 elements each, with a 6-8 dot/mm interval, and the blocks can be successively energized to form images. The energization control can be conducted with ease by using a diode matrix or the like. The total width of the resistor members which are energized is controlled in accordance with the lateral size of the recording paper sheets to eliminate unnecessary loss of power and to prevent deleterious transfer of ink onto the back roller 32. Further, the black information ratio for one line to be recorded can be calculated and, if it exceeds a predetermined ratio (for example, 25%), the number of blocks into which the elements are divided can be increased (for example, from 4 blocks to 8 blocks or 16 blocks), to thereby limit the number of resistor members which are simultaneously energized. Thus, it is not necessary to increase the capacity of the power source for the thermal recording head even when there is much black information.

A heat-sensitive paper web 33 is sent into the position between the back roller 32 and the thermal recording head 31, so as to contact the surface of the thermal recording head 31. The heat-sensitive paper web 33 is extended from a feed roll 34 by way of an automatic balance roller 35 for eliminating creases in the heat-sensitive paper web 33 to the back roll 32. It is preferred to situate an idler (not shown) at a position such that the heat-sensitive paper web 33 can be smoothly sent into the back roller 32.

The back roller 32 is disposed so as to urge against the thermal recording head 31, and it also contacts the feed roller 37 which is driven by an idler 38. Since the idler roller 38 is driven by a third step motor 39, the back roller 32 is driven stepwise by the rollers 38 and 37. With the driving of the step motor 39, the heat-sensitive paper web 33 is conveyed by the back roller 32 and feed roller 37.

The heat-sensitive paper web 33 contacts the surface of the thermal recording head 31 and, in accordance with the selective energization of the resistor members on the thermal recording head 31, images are formed on the heat-sensitive paper web 33. This image formation is conducted for each line. The paper web is fed stepwise by the back roller 32 and feed roller 37, sent to the discharge roller 42 provided downstream of the feed roller 37, cut into a predetermined length by an automatic cutter 41 provided downstream of the discharge roller, and the paper web is then sent to the discharge tray 40.

The thermal recording head 31, and the rollers 35, 37 and 38 are secured to a swing arm (not shown) swingably mounted on both sides of the reproducing machine, and the platen 11 is pivoted so as to open upwardly together with the cover 11'. With such an arrangement, when the heat-sensitive paper web 33 has been entirely consumed, the platen is opened upwardly, the components 31, 35 and 37-38 are swung out of the way and a new recording paper web roll can be mounted.

Figure 2:
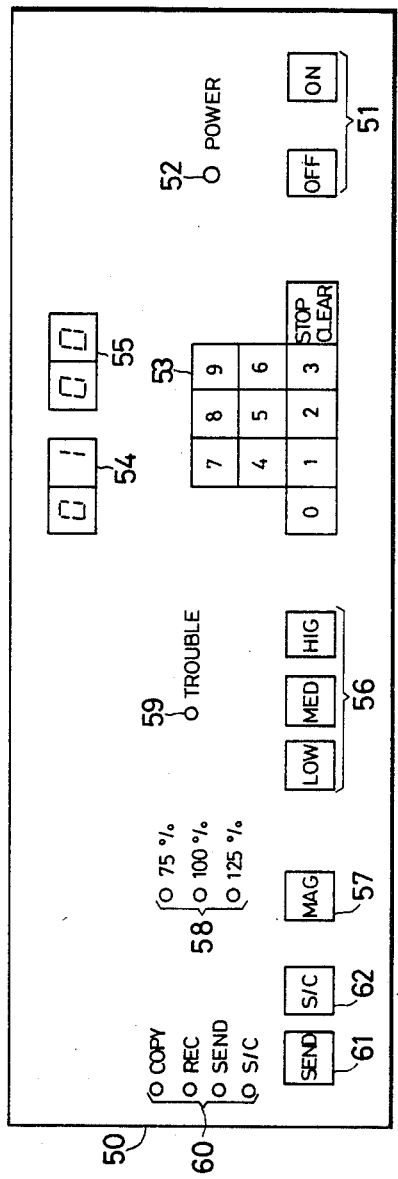
FIG. 2 is a front elevational view of the operation panel of the reproducing machine.

FIG. 2 shows an operation panel 50 of the reproducing machine according to this invention. A switch 51 is a power source switch, and a lamp 52 lights up when the power source is switched to ON. One of the numerical buttons 53 is used to select the number of copies and this number is displayed on a display 54. A STOP CLEAR button is pushed to set a new number as is well known. Another display 55 indicates the number of reproduced copies. Buttons 56 are used for selecting copy density and for starting the copying operation, i.e., reproduction is started while selecting the copy density at low density (LOW), medium density (MED) or high density (HIG) by pushing any of the buttons. A button 57 is used to select the magnification ratio, and the selected magnification ratio is displayed on a display 58 located just above. For instance, upon one push of the button 57 in a state where a 75% magnification ratio is displayed, the magnification ratio changes to 100%, then another push of the button 57 changes the magnification to 125%, then again to 75%, etc. A display 59 flickers if any trouble such as paper clogging should occur in the inside of the reproducing machine. The display 59 is extinguished by pushing the STOP CLEAR button after the trouble is corrected. A display 60 indicates the reproduction mode, in which only the COPY lamp is usually lighted to indicate the usual reproducing procedure. Upon receiving an external request signal, only the REC lamp is lighted whereby external image signals are received and formed as images on the heat-sensitive paper web. Upon pushing of a button 61, the SEND lamp is lighted to send image signals read by the image sensor 22 externally of the machine (reproduction is inhibited in this state). Upon pushing of a button 62, a lamp S/C is lighted and reproduction is conducted while sending read image signals externally.

Figure 3:
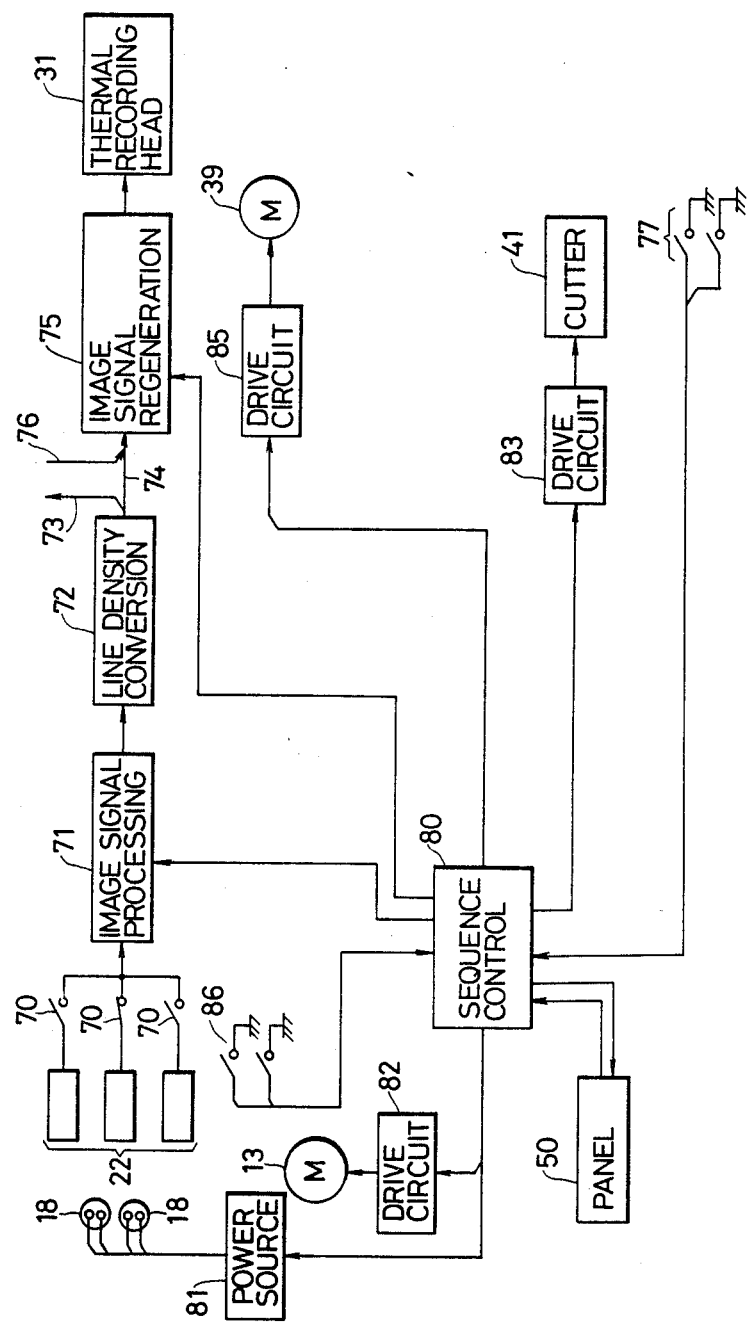
FIG. 3 is a circuit diagram for the reproducing machine.

FIG. 3 shows a circuit diagram for the reproducing machine according to this invention. The circuit may be provided within the reproducing machine or may be provided separately in another casing in order to decrease the size of the machine. Reference numeral 22 is the image sensor shown in FIG. 1. In this circuit diagram, the photo-receiving elements are indicated as being divided into three blocks, and switches 70 for successively switching the three blocks are provided. Serial image signals read by the image sensor 22 are inputted into an image signal processing circuit 71. The image signal processing circuit converts the signals into black and white binary signals after background compensation to eliminate background noise in the image signals. The image signal processing circuit is also provided with a white line skip function that skips the reading for any line which is entirely white. For realizing the white line skip function, it is preferable to provide, in the image sensor 22, image receiving elements capable of reading at least two lines simultaneously. Further, the image signal processing circuit 71 is also provided with a circuit for generating a pseudo intermediate tone signal that selects a plurality of different threshold levels during the conversion of the image signals into binary form, thereby generating black dot signals, so that a half-tone image can be regenerated.

The output from the image signal processing circuit 71 is inputted into a linear density conversion circuit 72 which converts the image signals read by the image sensor 22 at 12 dot/mm in accordance with the selected magnification ratio. For instance, it converts 12 dots into 8 dots at a 100% magnification ratio (1:1), 12 dots into 6 dots at a magnification ratio 75% (¾ reduction) and 12 dots into 10 dots at a magnification ratio 125% (5/4 enlargement) and outputs a signal binary image signals.

The machine according to this invention is a reproducing machine. However, since the output from the linear density conversion circuit 72 is in a form suitable for a facsimile transmitter or the like, i.e., a binary serial image signal output, the signals can also be transmitted to external receivers. Line 73 is a communication line for such external transmission. The line may be, for example, a telephone line, local communication line or wireless route. Further, the line could be coupled to an external image signal processor for image enhancement synthesis or to a noise elimination circuit.

In addition to the line 73, the output from the linear density conversion circuit 72 is directly connected by way of a line 74 to an image signal regeneration circuit 75. Switching between the lines 73 and 74 is determined by the mode of operation of the reproducing machine, wherein no output is issued to the line 73 when the COPY lamp is lighted in the display 60, no output is issued to the line 74 upon pushing of the button 61 to light up the SEND lamp, and outputs are issued simultaneously to the lines 73 and 74 upon pushing of button 62 to light up the S/C lamp.

The image signal regeneration circuit 75 comprises, as in a conventional facsimile receiver, an image signal regeneration circuit having a sync signal generation circuit. Accordingly, image signals from an external line 76 can also be received. Switching between the lines 74 and 76 can be selected according to the mode in the reproducing machine in the same manner as in the selection for the lines 73 and 74. For example, the line 74 is selected when the COPY lamp is lighted up, only the line 76 is selected when the REC lamp is lighted up, both of the lines are disconnected when the SEND lamp is lighted up, and only the line 76 is selected when the S/C lamp is lighted up.

The image signal regeneration circuit 75 also performs the function of relocating the image signal data in accordance with the scanning direction of the platen. As described above, while the platen 11 is reciprocating, image signals can be read not only during the forward stroke but also during the backward stroke of the platen. Therefore, since the reading order of the lines is inverted in the backward stroke relative to the forward stroke, it is necessary to relocate the lines of data. The signal regeneration circuit has such a function. The function is of course performed only during the backward scanning stage and it is not necessary during forward scanning, or while receiving data from the external line 76.

The image signal regeneration circuit 75 is also provided with a serial to parallel conversion circuit for converting serial image signals into parallel signals, whereby data for one line or for one block of sensors therein are prepared. A switch 77 for detecting the size of the recording paper (for example, A4 or B4) is provided near the roll 34, and the regeneration circuit 75 also includes a circuit for controlling the recording width of the thermal recording head 32 with the detected size signal. The circuit 75 further contains the above-mentioned diode matrix for the block control of the heat generation members on the head 31 and also a block control circuit for increasing or decreasing the foregoing block number. Accordingly, the output from the image signal regeneration circuit selectively energizes the heat generation resistor members on the thermal recording heat 31 to apply heat to the heat-sensitive paper web 33.

The details of the circuits 71, 72 and 75 will be obvious from their described functions most of which are generally known. These circuits may be identical to these disclosed in more detail in said U.S. Pat. No. 4,499,152.

A circuit 80 is a sequence control circuit which controls, in a sequential manner, a power source 81 for lighting up the optical source 18 for the image reading unit, a driving circuit 82 for energizing the step motor 13 for driving a platen, a driving circuit 85 for energizing the step motor 39 that drives the feed roller 37 and the back roller 32 by way of the idler roller 38 for advancing the recording paper web, a circuit 83 for energizing the automatic cutter 41, and the displays on the panel 50. The sequence controller 80 also controls the timing of the image signals in the image signal circuit 71. The sequence control circuit 80 conducts the reproducing operation when it receives an instruction to do so from the control panel 50, signals from a recording paper web size detection switch 77, and a signal from switch 86 that detects whether or not the platen 11 is at its home position.

The sequence controller may be identical to that in U.S. Pat. No. 4,449,152. The sequence control will be made clearer by the following explanation for the operation of the reproducing machine.

The operation of the reproducing machine according to this invention follows. It is assumed here that the COPY lamp in the display 60 is lighted on the panel 50. Upon pushing any of the buttons 56, the sequence control circuit 80, after confirming that the reproducing machine is operating normally, energizes the power source 81 to light up the optical source 18, and energizes the driving circuit 82 to drive the pulse motor 13 and set the platen 11 to its home position. The switch 86 detects that the platen 11 is at the home position and sends a detection signal to the sequence control circuit 80. If no signal arrives within a predetermined period, the reproducing machine stops and lights up the display 59 to indicate trouble.

When the detection signal from switch 86 is received, the platen motor 13 is actuated to stepwise advance the platen 11 and scan the original. The platen is moved through a distance corresponding to the length of the original as determined by the switch 77, and the image sensor 22 in the image reading unit 17 reads the original line by line. The images from the image sensor 22 are sent by way of the circuits 71, 72 and 75 to the thermal recording head 31. The step motor 39 is actuated during or before the above operation to register the recording paper web with the thermal recording head by the back roller 32. A predetermined blank space, or margin, is provided at the beginning of the recording paper by advancing the paper slightly past the head 31. Information on every line is recorded on the web by the image signals sent to the thermal recording head. The feed rate of the back roller is different depending on the magnification ratio in the reproduction, e.g., the ratio may be set as 75%:100%:125%=3:4:5.

The recorded paper web is then sent to the automatic cutter 41, cut into a predetermined length and then discharged to the discharge tray 40. In the case of single copy reproduction, the platen 11 is rapidly returned to the home position after the completion of the reproduction. In a case of multiple copy reproduction, reproducing procedures are conducted also in the backward stroke. In the latter case, since the moving direction of the recording sheet in the backward stroke is the same as in the forwarding stroke while the direction for reading the data read by the image sensor 22 is inverted, the data signals would be recorded as mirror images if the data read in the image sensor are outputted as they are directly to the thermal recording head. In view of the above, a one line data relocation circuit is operated in the image signal regeneration circuit 75 to compensate for such a disadvantage and record the positive images to the web.

Although the foregoing operation has been described with regard to the COPY mode, other modes of operation will be obvious from the above explanation. For instance, no image reading is conducted but rather only the recording operation is conducted in the REC mode, no recording operation is conducted but only the image reading is conducted in the SEND mode, and the reproducing operation is conducted and image signals are transmitted as well by way of the line 73 in the S/C (SEND/COPY) mode.

While it has been described a reproducing machine in which the platen 11 is moved past the image reading unit 17, it is possible to modify the machine so that the image reading unit 17 is reciprocally movable relative to the platen which is stationarily secured to the machine. In this case, the rails 12 provided for reciprocal movement of the platen 11 are not necessary. Instead, it is necessary that rails be provided on both sides of the middle portion of the reproducing machine for reciprocal movelent of the image reading unit.

This invention provides a reproducing machine enabling multiple copy reproduction with less electrical power consumption and in a simple structure, and the reproducing machine can perform not only the reproducing operation but can also perform transmission and reception relative to external facilities, to thereby perform image synthesis, noise elimination and image modification or enhancement.

While the invention has been described in detail and with reference to specific embodiments thereof, it will be apparent to one skilled in the art that various changes and modifications can be made therein without departing from the spirit and scope thereof.

What is claimed is:

1. A thermal recording type copying machine, comprising:
   a platen for arranging an original thereon, said original having image information thereon;
   a read unit for reading the image information of the original during relative movement of said platen and read unit and for converting the read image into electrical picture signals;
   a thermal recording head having heating elements for generating heat in accordance with said electrical picture signals;
   a source of continuous heat-sensitive recording paper web;
   conveying means for conveying said heat-sensitive recording paper web, while being in close contact under pressure, past said heating elements of said thermal recording head whereby an image of said original is recorded on said heat-sensitive recording paper; and
   means for discharging said recorded paper from said machine;
   said read unit converting said image information into electrical picture signals with a resolution of X picture signal dots per mm of original image information and said heating elements being energized at a spacing of Y elements per mm, said machine effecting enlargement and reduction by varying said spacing Y without changing said thermal recording head, whereby enlargement, reduction and 1:1 copying operations can be effected using the same thermal recording head.

2. A copying machine as claimed in claim 1, wherein said electrical picture signals having a resolution of X picture signal dots/mm are converted into electrical picture processing signals having a resolution of Y picture signal dots/mm, said electrical picture processing signals being received by said thermal recording head to energize said heating elements.

3. A copying machine as claimed in claim 2, wherein said read unit includes a first shift register for converting said electrical picture signals into a parallel address signal, a ROM, said ROM receiving said parallel address signal and a selection signal to convert said parallel address signal into a parallel output signal, and a second shift register for converting said parallel output signal into said electrical picture processing signals.

4. A thermal recording type copying machine, comprising:
   a platen for arranging an original thereon, said original having image formation thereon;
   a read unit for reading the image information of the original during relative movement of said platen and read unit and for converting the read image into electrical picture signals;
   a thermal recording head having heating elements for generating heat in accordance with said electrical picture signals, wherein said thermal recording head includes a plurality of blocks of heating elements and energizing means for energizing said heating elements, each said block including a plurality of heating elements, and wherein said energizing means energizes heating elements only within one of said blocks at any one time and varies the number of elements within each block in accordance with the density of said image information;
   a source of continuous heat-sensitive recording paper web;
   conveying means for conveying said heat-sensitive recording paper web, while being in close contact under pressure, past said heating elements of said thermal recording head whereby an image of said original is recorded on said heat-sensitive recording paper; and
   means for discharging said recorded paper from said machine.

5. A copying machine as set forth in claim 4, further comprising an output terminal providing said electrical picture signals externally of said copying machine so that picture signal processing operations such as the composition or deletion of picture image portions may be performed externally of said copying machine, and input terminal means for receiving said externally processed signals for application to said thermal recording head.

6. A copying machine as set forth in claim 4, wherein said copying machine has a variable magnification value, said conveying means conveying said heat-sensitive paper web past said thermal recording head at a speed corresponding to said magnification value.

7. A thermal recording type copying machine, comprising:

a platen for arranging an original thereon, said original having information thereon;

a read unit for reading the image information of the original during relative movement of said platen and read unit and for converting the read image into electrical picture signals during both backward and forward movements of said platen relative to said read unit;

a thermal recording head having heating elements for generating heat in accordance with said electrical picture signals;

a source of continuous heat-sensitive recording paper web;

conveying means for conveying said heat-sensitive recording paper web, while being in close contact under pressure, past said heating elements of said thermal recording head whereby an image of said original is recorded on said heat-sensitive recording paper;

means for discharging said recorded paper from said machine; and picture signal processing means receiving said electrical picture signals and rearranging the picture signals derived during a backward stroke of said platen in the copying operation of said copying machine, to thereby permit copying operation during both forward and backward strokes, said picture signal processing means comprising a shift register, said shift register receiving said image information from said read unit and outputting said information in a first parallel form during a forward stroke of said read unit and outputting said information in a second parallel form during a backward stroke of said read unit, said first and second parallel forms being opposites of each other.

8. A copying machine as claimed in claim 7, further comprising a first RAM for storing said information from said shift register of said first parallel form, a second RAM for storing said information from said shift register of said second parallel form, a first data selector for reading out said first and second RAMs, said data selector reading out said first RAM during a first direction of relative movement between said platen and said read unit and reading out said second RAM during a second direction of relative movement between said platen and said read unit.

9. A copying machine as claimed in claim 8, further comprising a second data selector receiving the output of said first data selector, said second data selector separating said information to form a plurality of separate data groups.

10. A thermal recording type copying machine, comprising:

a platen for arranging an original thereon, said original having image information thereon;

a read unit for reading the image information of the original during relative movement of said platen and read unit and for converting the read image into electrical picture signals;

a thermal recording head having heating elements for generating heat in accordance with said electrical picture signals;

a source of continuous heat-sensitive recording paper web;

conveying means for conveying said heat-sensitive recording paper web, while being in close contact under pressure, past said heating elements of said thermal recording head whereby an image of said original is recorded on said heat-sensitive recording paper;

means for determining the width of the original and means for controlling the total width of energized heating elements in accordance with the width of said original regardless of any electrical picture signals produced by said read unit outside of said detected width; and means for discharging said recorded paper from said machine.

11. A copying machine as claimed in claim 10, further comprising means for detecting the lateral width of said heat-sensitive recording paper, and means for controlling the total width of heating elements energized in accordance with the detected lateral width of said recording paper web.

12. A thermal recording type copying machine, comprising:

a platen for arranging an original thereon, said original having image information thereon;

a read unit for reading the image information of the original during relative movement of said platen and read unit and for converting the read image into electrical picture signals;

a thermal recording head having heating elements for generating heat in accordance with said electrical picture signals;

picture signal processing means for converting said electrical picture signals into binary signals, said picture signal processing means converting said electrical picture signals to binary signals by comparing said picture signals to threshold levels, said picture signal processing means selectively using a plurality of different threshold levels for achieving half-tone reproduction;

a source of continuous heat-sensitive recording paper web;

conveying means for conveying said heat-sensitive recording paper web, while being in close contact under pressure, past said heating elements of said thermal recording head whereby an image of said original is recorded on said heat-sensitive recording paper; and means for discharging said recorded paper from said machine.

13. A copying machine as claimed in any one of claims 1, 4–5, 8 and 12, wherein said platen is movable past said read unit.

* * * * *